May 23, 1950 D. B. LUTEN, JR., ET AL 2,508,922
SEPARATION OF DIENES
Filed May 17, 1948
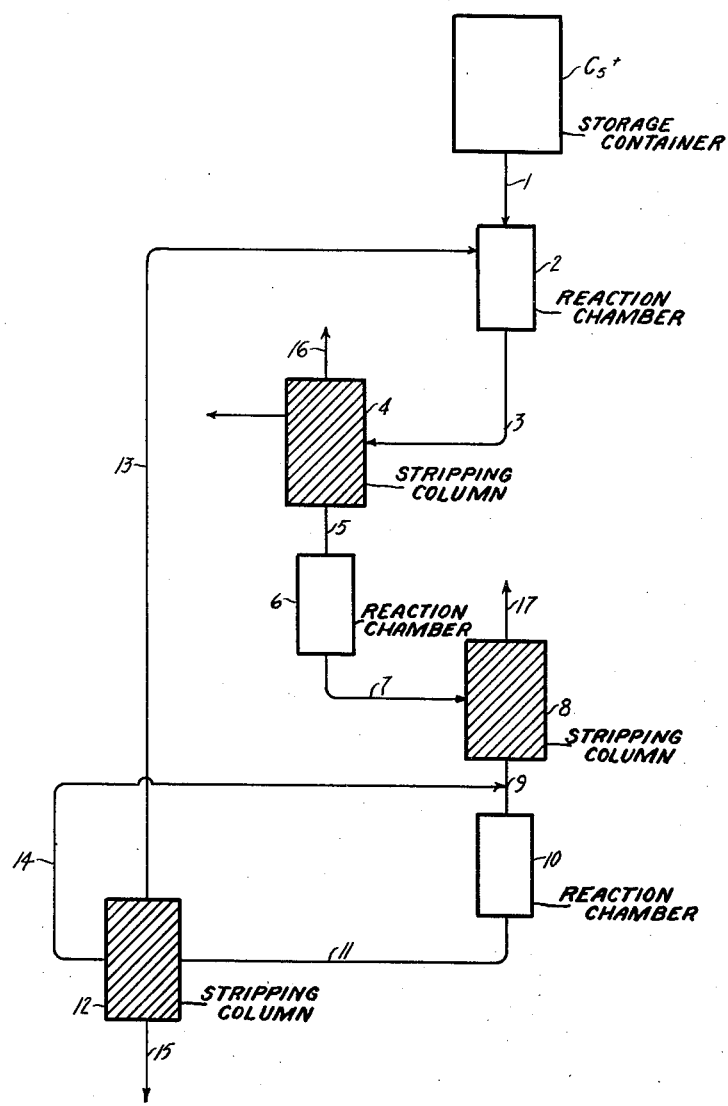
Inventors: Daniel B. Luten, Jr.
Aldo De Benedictis
Kenneth W. Hedberg
By their Attorney:

Patented May 23, 1950

2,508,922

UNITED STATES PATENT OFFICE 2,508,922

SEPARATION OF DIENES

Daniel B. Luten, Jr., Berkeley, Kenneth W. Hedberg, Pasadena, and Aldo De Benedictis, Berkeley, Calif., assignors to Shell Development Company, San Francisco, Calif., a corporation of Delaware Application May 17, 1948, Serial No. 27,454

4 Claims. (Cl. 260—666)

This invention relates to the separation of aliphatic conjugated dienes and alicyclic conjugated dienes from hydrocarbon mixtures containing the same. More particularly the invention relates to a process for the separation of isoprene and cyclopentadiene from hydrocarbon mixtures containing the said compounds.

More specifically, the invention provides a practical and highly economical process for the separation in large yields of isoprene and cyclopentadiene from hydrocarbon mixtures containing the same which comprises subjecting the mixture containing the isoprene and cyclopentadiene to a dimerization treatment wherein the cyclopentadiene is dimerized to dicyclopentadiene and a small fraction of the isoprene combines with itself to form an isoprene dimer (limonene) and with cyclopentadiene to form a co-dimer, separating the dimerized fraction from the undimerized fraction, processing the undimerized fraction for isoprene, subjecting the dimerized fraction to a temperature between about 150° C. to about 450° C., preferably between 350° C. to 450° C. for a relatively short period of time, to selectively convert the dicyclopentadiene to cyclopentadiene, separating the monomeric cyclopentadiene from the dimer fraction, treating the dimer fraction to a temperature above 500° C., preferably 500° to 700° C., to dedimerize the isoprene dimer and co-dimer to monomeric isoprene and cyclopentadiene, separating out the monomeric isoprene and cyclopentadiene and recycling them to the dimerization step.

Conjugated diene hydrocarbons, such as isoprene and cyclopentadiene, are of importance in industry due to their ability to readily undergo condensation and polymerization. Isoprene is of importance, for example, in the manufacture of synthetic rubber, while cyclopentadiene is of importance in the production of synthetic resin materials. A very inexpensive source of the isoprene and cyclopentadiene is the hydrocarbon fractions obtained by the fractional distillation of coal tar, cracked natural gas and cracked petroleum. A satisfactory commercial method for the recovery of isoprene and cyclopentadiene from these hydrocarbon fractions has not, however, been developed heretofore.

Separation of isoprene and cyclopentadiene from the hydrocarbon mixtures by mere fractional distillation has proved unsatisfactory as the isoprene and cyclopentadiene fractions obtained thereby are invariably contaminated with closely related components.

The art has disclosed several methods for the separation of isoprene and cyclopentadiene from hydrocarbon mixtures based on the differences in the rate with which the isoprene and cyclopentadiene undergo dimerization; the cyclopentadiene undergoing the dimerization quite rapidly while isoprene undergoes dimerization only very slowly. In these suggested methods the hydrocarbon mixture containing the two compounds is first heated to a low temperature to dimerize substantially all the cyclopentadiene. The resulting mixture is then separated into an undimerized fraction which is processed for isoprene, and a dimerized fraction which is subsequently treated at the boiling point of the dicyclopentadiene, e. g., about 170° C. to decompose the dicyclopentadiene to cyclopentadiene. These suggested methods have proved, however, to be quite inefficient in effecting a substantially complete removal of all of the potential isoprene and cyclopentadiene from the hydrocarbon fractions. It has been found, for example, that in most cases only about 65% to about 75% of the potential isoprene is able to be recovered by these processes.

It is an object of this invention, therefore, to provide an efficient and highly economical process for the recovery of isoprene and cyclopentadiene from hydrocarbon fractions containing the said compounds. It is a further object of the invention to provide a method for the recovery of isoprene and cyclopentadiene from hydrocarbon mixtures in much higher yields than has been possible, heretofore. It is still a further object to provide a method that can be applied, in general, to effect a substantially complete separation of aliphatic conjugated diene hydrocarbons from their closely related alicyclic conjugated diene hydrocarbons from hydrocarbon fractions in which they are both contained. Other objects will be apparent from the detailed description of the invention given hereinafter.

It has now been discovered that these and other objects may be accomplished by the novel process of the invention which comprises subjecting the hydrocarbon mixture containing the isoprene and cyclopentadiene to a dimerization treatment wherein the cyclopentadiene is dimerized to dicyclopentadiene and a small fraction of the isoprene combines with itself to form limonene and with cyclopentadiene to form a co-dimer, separating the dimerized fraction from the undimerized fraction, processing the undimerized fraction for isoprene, subjecting the dimerized fraction to a temperature between about 150° C. to about 450° C., preferably 350° C. to 450° C. for a relatively short period of time, to selectively convert the dicyclopentadiene to cyclopentadiene, separating the monomeric cyclopentadiene from the dimer fraction, treating the dimer fraction to a temperature above 500° C., preferably 500° C. to 700° C. to dedimerize the isoprene dimer and co-dimer to monomeric isoprene and cyclopentadiene, separating out the monomeric isoprene and cyclopentadiene and recycling them to the initial dimerization step.

It was found that the low efficiency in the recovery of the isoprene and cyclopentadiene by the previous methods was due to the fact that during the fractionation period of the hydrocarbon mixture containing the isoprene and cyclopentadiene and during the subsequent dimerization treatment to form dicyclopentadiene a substantial amount of the isoprene dimerizes with itself to form limonene or with cylopentadiene to form a co-dimer. These isoprene dimers and co-dimers are separated with the cyclopentadiene dimer but remain unaffected by the dedimerization treatment and are ultimately discarded. By the present process, however, these fractions of isoprene and cyclopentadiene are readily recovered and transferred into the isoprene and cyclopentadiene yields so as to effect for the first time a substantially complete recovery of all of the potential isoprene and cyclopentadiene from the hydrocarbon fraction.

The process of the invention is based upon the discovery that when dimers of conjugated diene hydrocarbons are subjected to high temperatures for relatively short periods of time there is a preferential or selective cracking of the dimers at such selective ranges as to permit dimers to be dedimerized at separate temperatures and the components of the dimer to be quantitatively recovered in substantially pure form. The specific high temperature cracking range for the dimers was found to vary with the structure and composition of the individual dimer, for example, dicyclopentadiene decomposes to its monomer when subjected to temperatures ranging from about 150° C. to about 450° C. The dimer of isoprene (limonene) and the codimer of isoprene and cyclopentadiene dedimerizes to the respective monomers at a temperature above about 500° C. By thus employing the higher cracking temperatures and varying the temperature range the dicyclopentadiene and isoprene dimers may be selectively dedimerized and the loss of isoprene and cyclopentadiene occasioned in the prior known methods can be substantially eliminated.

In the process of the invention the hydrocarbon mixture containing the isoprene and cyclopentadiene is dimerized by heating the said mixture to a sufficiently high temperature to cause the formation of the dicyclopentadiene. Small amounts of the dimer and the codimer of isoprene will also be formed during this dimerization treatment. The resulting mixture is then separated, preferably by fractional distillation, into a dimerized fraction and an undimerized fraction. An intermediate aromatic fraction may be removed from the mixture if desired. The undimerized fraction is then processed for isoprene. The dimerized fraction is subjected to a temperature between 150° C. to 450° C., preferably 350° C. to 450° C., for a relatively short time to selectively decompose the dicyclopentadiene to monomeric cyclopentadiene. This pyrolyzed mixture is then separated, preferably by fractional distillation, into two cuts (1) top cut comprising relatively pure monomeric cyclopentadiene and (2) a bottom cut comprising the dimers which remain unaffected by the pyrolysis treatment. The bottom dimer fraction is then subjected to a temperature of above 500° C., preferably 500° C. to 700° C., to selectively decompose the limonene, and co-dimer of isoprene and cyclopentadiene into monomeric isoprene and cyclopentadiene. The resulting pyrolyzed mixture is then separated, preferably by distillation, into three fractions, (1) monomeric material, (2) unconverted dimers, and (3) a tar residue. The monomers are recycled to the initial dimerization step where they will go through the process again. The unconverted dimer fraction is recycled to the second dedimerization treatment and the tar residue is discarded.

To more clearly illustrate how the process of the invention may be applied to the separation of isoprene and cyclopentadiene from the hydrocarbon mixtures containing two compounds a drawing has been attached to show in the form of a flow diagram how the process may operate to effect the separation of isoprene and cyclopentadiene from a $C_5+$ fraction obtained from the fractionation of cracked natural gas. It is to be understood, however, that the drawing is not to be considered as limiting the invention in any way.

Referring now to the drawing, the $C_5+$ hydrocarbon fraction containing the isoprene and cyclopentadiene is taken from a storage container through conduit 1 to reaction chamber 2 where the dimerization of the cyclopentadiene is to take place. In chamber 2 the hydrocarbon feed is subjected to a temperature of between about 90° C. to about 120° C. for about 10 to 13 hours in order to convert substantially all of the cyclopentadiene to the dimer form. The products of the dimerization reaction are then taken through conduit 3 to a stripping column 4, the kettle of which is maintained at a temperature below 140° C. Three fractions are obtained from the distillation, (1) an isoprene fraction stripped out at a temperature of about 34° C. to 40° C., (2) an intermediate aromatic fraction at a temperature between 70° C. to 80° C., and (3) a high-boiling dimer fraction. The high-boiling dimer fraction usually comprising dicyclopentadiene, limonene and the co-dimer of isoprene and cyclopentadiene is taken through conduit 5 to reaction chamber 6 to undergo a selective pyrolysis treatment. Here in chamber 6 the dimer fraction is subjected to a temperature of between 150° C. to 450° C., preferably 350° C. to 450° C. and preferably in the presence of steam, for a short period, preferably between about 0.5 second to 2 seconds, wherein the dicyclopentadiene is rapidly dedimerized to monomeric cyclopentadiene. The vapors are rapidly condensed and taken through conduit 7 to a stripping column 8 where the cyclopentadiene is romoved overhead at a temperature of about 40° C. The residue from the stripping column which now comprises mainly the dimer of isoprene, and the co-dimer of isoprene and cyclopentadiene is taken through conduit 9 to reaction chamber 10. In chamber 10 the dimer fraction remaining from the first pyrolysis treatment is exposed to a temperature of above 500° C., preferably 550° C. to 650° C., and preferably in the presence of steam, for a short reaction time, preferably between about .5 second to 2 seconds, wherein the dimers are dedimerized to their respective monomers. The vapors are rapidly condensed and taken through conduit 11 to a stripping column 12 wherein the monomeric material is separated from the residue and taken through conduit 13 to chamber 2 to be dimerized again. Unconverted dimers are taken back to chamber 10 through conduit 14 and the tar residue in the kettle of the stripping column is taken off through conduit 15. The cyclopentadiene recovered at conduit 17 is in substantially pure form. The unchanged portion of the $C_5$ fraction recovered at conduit 16 is processed for isoprene.

The hydrocarbon mixture used in the process of the invention as a source of isoprene and cyclopentadiene may be a mixture consisting solely of isoprene and cyclopentadiene or the mixture may consist of other hydrocarbon compounds in addition to the isoprene and cyclopentadiene. Suitable mixtures to be used in the process of the invention are those fractions containing the isoprene and cyclopentadiene that are secured as byproducts in the natural gas, coal tar and petroleum industries. Examples of such mixtures are the hydrocarbon fractions produced in the manufacture of coal gas, coke oven gas, carburated water gas, oil gas, the fractions from the destructive distillation of coal, the fractions from the distillation of natural gas, petroleum and the like. It may be advisable in some cases to first remove from these hydrocarbon fractions, by means of fractional distillation, a $C_5+$ cut containing the isoprene and the cyclopentadiene and use this simplified fraction as the stock material to be treated in accordance with the process of the invention.

A preferred hydrocarbon mixture to be used as stock material for the process of the invention is a $C_5+$ fraction obtained from stove cracking of gasoline or coking of coal. The composition of such fractions will vary depending upon the source of the gas but will, in general, contain from about 20% to about 40% of isoprene and trans-piperylene about 3% to about 15% cyclopentadiene, and about 10% to about 35% mixed dimers which have been formed in the fractionation steps involved in the separation of the $C_5+$ fraction. These fractions contain potentially about 35% isoprene and almost equally potential amounts of cyclopentadiene which may later be removed by the present process.

The dimerization of the hydrocarbon mixture containing the isoprene and cyclopentadiene may be accomplished by any suitable method. A preferred method for the dimerization of the hydrocarbons is to subject the mixture to heat. The dimerization of the alicyclic conjugated dienes, such as cyclopentadiene, singly or in mixture with other hydrocarbons, is, in general, a thermal reaction following the Arrhenius equation and the rate of the dimerization increases with an increase in temperature. The dimerization reaction is also reversible and the rate of the dedimerization of the dimers increases with the temperature until, near the boiling point of the dicyclopentadiene, the rate of the dedimerization proceeds with measurable velocity. It is usually preferred to maintain the temperature of dimerization below the boiling point of the dicyclopentadiene. Temperatures maintained about 30° C. to about 50° C. below the boiling point of dicyclopentadiene dimer (B. P. about 170° C.) will, in general, produce only a very slow dedimerization of the dimer of cyclopentadiene. Lower temperatures are also preferred because such temperature ranges tend to minimize the isoprene loss through the formation of the isoprene dimers. At the lower ranges of temperature the dimerization takes place slowly at a temperature near 50° C. with a satisfactory rate of dimerization usually taking place at temperatures near 70° C. The preferred temperature range, therefore, for the dimerization treatment of the hydrocarbon mixture containing the cyclopentadiene and isoprene lies between about 50° C. to about 130° C. with a particularly preferred range being between 70° C. to about 120° C.

The length of the dimerization treatment will vary depending upon the concentration of the cyclopentadiene in the mixture and the temperature employed. The period for the dimerization treatment may readily be obtained by use of the following equation:

$$\log t = \log\left(19.2 - \frac{9.6}{A}\right) + \frac{3650}{T} - 9.93 \pm 1$$

wherein $T$ is the dimerization temperature in degrees Kelvin. $A$ is the concentration of cyclopentadiene in per cent by weight and $t$ is the time in hours.

The dimerization may be accomplished in the presence or absence of solvents and/or diluents. It has also been found advantageous in some cases to conduct the dimerization under a blanket of an inert gas, such as nitrogen, to avoid the presence of formation of peroxides which lead to the production of higher polymerization products.

The dimerization may be accomplished in the liquid or vapor phase, but is preferably effected in the liquid phase. Superatmospheric, subatmospheric or atmospheric pressures may be used. Satisfactory results have been obtained when atmospheric pressure or substantially atmospheric pressures are employed and they are generally preferred.

The separation of the dimerized fraction which includes dicyclopentadiene and small amounts of the dimers of isoprene may be accomplished by any suitable means comprising such methods as extraction, distillation, etc. The more preferred method is to use distillation and strip the isomeric and the other monomeric components from the polymeric fraction by means of a fractionating or stripping column. By this preferred method the products of the dimerization step of the process are brought into a stripping column, the kettle temperature of which is maintained at a temperature below the decomposition point of the dicyclopentadiene. As stated hereinabove, temperatures about 30° C. to 50° C. below the decomposition point, i. e., temperatures below about 140° C. to 120° C. will not cause depolymerization of the dicyclopentadiene. Isoprene has the lower boiling point and will be stripped off first. The other components, usually consisting of aromatic compounds, boil at slightly higher temperatures and are stripped off next, preferably under reduced pressures to prevent the depolymerization of the dimer fraction.

The distillation of the dimerized fraction may be accomplished at atmospheric, superatmospheric or subatmospheric pressures but, as explained above, it is preferred to remove most of the monomeric components under reduced pressure.

The isoprene stripped from the dimerized fraction may require additional processing which may be accomplished by any of the known methods for such purification. Such methods include an extractive distillation of the isoprene using compounds such as acetone, or by the formation of complex ions of the isoprene with heavy metal cations such as an ammoniacal cuprous acetate solution and later decomposing the ion to give the pure isoprene.

After the removal of the monomeric hydrocarbons, the dimerized fraction is subjected to the pyrolysis treatment to dedimerize the dicyclopentadiene.

The pyrolysis reaction is not exothermic and external heat must be applied. The heat may be applied to the chamber by any suitable chemical or electrical means. Preferred method is to furnish heat by means of a gas furnace placed in contact with the pyrolysis chamber. The temperature may best be controlled by locating thermocouples at various distances throughout the pyrolysis chamber.

The selective high temperature to be maintained for the dedimerization of the dicyclopentadiene will lie between about 150° C. to 450° C. Preferred temperatures are those between about 350° C. to about 400° C. Temperatures above the preferred range, i. e., above 400° C. are usually not preferred as they give a substantial amount of impurities in the reaction mixture, due to the decomposition of the cyclopentadiene, etc.

The residence time for the pyrolysis treatment of the dicyclopentadiene may vary over a considerable range and may best be determined for each individual case. The dedimerization reaction follows the Arrhenius equation and the time and temperature relationship may be determined by consideration of this equation. A simplified version of the equation is presented below:

$$\log t \text{ (seconds)} = \frac{7740}{T} - (13.1) \pm 1$$

wherein $t$ is residence time in seconds and $T$ is the pyrolysis temperature in degrees Kelvin. By substituting in the proper value for $T$ the value for $T$ may be readily reduced. In general, period varying from about .2 second to about 4 seconds should be sufficient for the depolymerization of the dicylopentadiene with the more preferred range being between .5 second and 2 seconds.

In some cases it may be advisable to introduce water into the pyrolysis chamber during the dedimerization treatment so that it may act as a diluent and slow down the re-dimerization reaction.

The vapors from the pyrolysis chamber are preferably cooled rapidly on their exit therefrom by means of a condenser and collected in a suitably cooled container. The separation of the cyclopentadiene from the unconverted dimers may be accomplished by any suitable means. A preferred means is by distillation similar to the above-described distillation process for the separation of the isoprene. In this case the temperature of the stripping column should everywhere be maintained below the decomposition temperature of the remaining dimers, i. e., in general, below about 120° C. Reduced pressures may advantageously be used to minimize the re-dimerization of the cyclopentadiene so that column temperatures where substantial condensations of cyclopentadiene exist do not exceed 60° C. and preferably do not exceed 30° C.

After separation of the cyclopentadiene the remaining dimers, which comprise limonene and the co-dimer of isoprene and cyclopentadiene are subjected to dedimerization treatment. The temperature to be maintained in this dedimerization treatment will be in a higher range, above 500° C. A preferred temperature range to be used for this second pyrolysis treatment lies between about 550° C. to 700° C.

The residence time for this second pyrolysis treatment will be relatively short and will depend upon the particular dimer fraction involved and upon the temperature maintained in the reaction chamber. The residence time, in general, resembles those of the first pyrolysis reaction, i. e., varying from .5 second to about 4 seconds with the more preferred range being between .5 second and 2 seconds. Longer or shorter residence times may be used depending upon the above-described conditions. It is also preferred in some cases to introduce into the chamber a quantity of water which will act as a diluent and minimize higher order reactions.

The vapors of this second pyrolysis treatment are also preferably cooled rapidly on their exit from the chamber by means of a condenser and collected in a suitable container. The separation of monomeric isoprene and monomeric cyclopentadiene from the remaining residue may be accomplished by any means, preferably by the above-described method of distillation. Remaining in the residue will also be, in some cases, small quantities of the unconverted limonene and cross-polymer of isoprene and cyclopentadiene. These are preferably removed by distillation and recycled to the second pyrolysis chamber to again undergo depolymerization. The isoprene and cyclopentadiene recovered from mixture resulting from this second pyrolysis treatment are preferably recycled to the initial dimerization step to again undergo the separation process.

The process of the invention is characterized by the high percentage recovery of isoprene as well as by the exceptionally fine state of purity of the cyclopentadiene recovered during the process. The loss of isoprene to the cyclopentadiene fraction which ran as high as 35% in the previous known methods for the separation of the two compounds has been reduced by the process of the invention to, in some cases, less than 1%.

To illustrate the manner in which the invention may be carried out the following examples are given. It is to be understood, however, that the examples are for the purpose of illustration and are not to be regarded as limiting the invention in any way.

*Example I*

A $C_5+$ fraction, obtained from the distillation of stove cracking of gasoline containing about 25.1% isoprene, and about 4% cyclopentadiene and about 19% mixed dimers is placed in a 100 gallon lead-lined steam jacketed mixer and heated to about 100° C. for 13 hours. After the period of treatment an analysis of the contents shows that substantially all of the cyclopentadienes have been converted to dicyclopentadiene and about 8.9% of the isoprene has been converted to limonene and the cross-polymer of isoprene and cyclopentadiene.

The mixture resulting from the above dimerization process is then subjected to distillation to remove isoprene. The pressure is reduced during the course of the distillation to minimize decomposition and further polymerization by avoiding high kettle temperatures. Three fractions are removed (1) a $C_5$ cut consisting chiefly of isoprene at about 30° C. to about 40° C. at 760 mm. of mercury pressure, (2) aromatic compounds (benzene at 41.2° C. at 200 mm. pressure, and toluene at 38° C. to 40° C. at 60 mm. pressure) and (3) a high-boiling dimer fraction.

The high-boiling dimer fraction is then placed in a buret and forced into the pyrolysis chamber through a rotameter by nitrogen gas, slightly in excess of atmospheric pressure. The temperature of the chamber is maintained at about 400° C. as indicated by the thermocouple readings. After exposure to this high temperature for about 1.5 seconds the vapors are cooled and collected in an ice-cooled receiver.

The cyclopentadiene is then separated from the residue of the pyrolysis treatment by fractional distillation. The mixture is placed in a column described hereinabove and the cyclopentadiene is taken off overhead at a temperature of about −7.6° C. at 100 mm. pressure.

The bottom fraction from the above separation of the cyclopentadiene is then forced under nitrogen pressure into the pyrolysis chamber which is now maintained at a temperature of about 600° C. After exposure of the mixture to the high temperature the vapors are cooled and prepared for final separation of the remaining portions of isoprene and cyclopentadiene as well as any portion of unconverted dimers of isoprene.

The mixture is placed in the above-described fractionating column and the isoprene and cyclopentadiene taken off overhead at −10° C. to about 5° C. The mixture of the isoprene and cyclopentadiene is then recycled to the initial dimerization treatment.

The isoprene fraction recovered after the dimerization step is subjected to further purification by extractive distillation using acetone and the percentage of isoprene recovered plus the isoprene recovered at the completion of the last pyrolysis treatment represents over 100% of the isoprene based on the monomeric isoprene present in the original hydrocarbon feed.

The relatively pure cyclopentadiene recovered after the dicyclopentadiene had been depolymerized and the cyclopentadiene recovered after the final pyrolysis treatment represents 97.6% of the monomeric and dimeric cyclopentadiene present in the original charge.

*Example II*

A liquid mixture of lower hydrocarbons obtained from the fractionation of petroleum and containing about 29.8% isoprene about 6.2% cyclopentadiene and about 19% mixed dimer is introduced into the lead-lined steam jacketed mixer and heated to about 130° C. for 15 hours. After that period of treatment an analysis of the contents shows that 96% of the cyclopentadiene has been converted to dicyclopentadiene and about 30.4% of the isoprene has been converted to its dimers.

The above mixture is then subjected to distillation. Three fractions are removed (1) a C$_5$ fraction comprising monomeric isoprene, (2) an intermediate aromatic cut and (3) a high-boiling dimer fraction.

The high-boiling dimer fraction is then forced into the pyrolysis chamber under slight pressure. The temperature of the chamber is maintained at 370° C. as indicated by the thermocouple readings. The time of reaction is limited to 2 seconds after which the vapors are cooled and collected in an ice-cooled receiver.

The cyclopentadiene is then separated from the residue of the pyrolysis treatment by fractional distillation. The cyclopentadiene is taken off overhead at a temperature of about −7.60° C. at 100 mm. pressure.

The bottom fraction from the above-described distillation is pyrolyzed at 600° C. to depolymerize the remaining dimers. The residence time in this case is maintained at 1.5 seconds with water being introduced into the chamber as a diluent. After cooling of the vapors the mixture is then subjected to a final distillation to remove the monomeric isoprene and cyclopentadiene.

The isoprene fraction recovered after the dimerization step is purified by extractive distillation using acetone and the percentage of isoprene recovered plus the isoprene recovered in the last step represents 96% of the monomeric isoprene present in the charge.

The pure cyclopentadiene recovered after the dicyclopentadiene had been dedimerized, plus the cyclopentadiene recovered after the final pyrolysis treatment represents 96.5% of the cyclopentadiene in the original charge.

*Example III*

A liquid mixture of lower hydrocarbons obtained as a by-product from the destructive distillation of coal, containing about 18.3% isoprene and about 9.7% cyclopentadiene is processed according to the method of Example II. Substantially all of the isoprene in the fraction is accounted for while 96% of the cyclopentadiene is recovered in relatively pure form.

We claim as our invention:

1. A process for the separation of isoprene and cyclopentadiene from a C$_5$+ hydrocarbon fraction which comprises heating the said fraction containing the isoprene and cyclopentadiene at a temperature of about 100° C. whereby substantially all of the cyclopentadiene dimerizes to dicyclopentadiene and part of the isoprene dimerizes to limonene and a co-dimer of isoprene and cyclopentadiene, subjecting the resulting mixture to fractional distillation to remove (1) a C$_5$ cut comprising monomeric isoprene, and (2) a high-boiling dimer fraction, processing the C$_5$ cut for isoprene, heating the high-boiling dimer fraction at a temperature of about 400° C. for between about .5 to 2 seconds in the presence of steam whereby the dicyclopentadiene is converted to monomeric cyclopentadiene, subjecting the pyrolyzed mixture to fractional distillation to remove (1) a top product of pure cyclopentadiene, and (2) a bottom product of isoprene dimers unaffected by the pyrolysis treatment, heating the unconverted dimers at a temperature of about 600° C. for between about .5 to 2 seconds in the presence of steam whereby the limonene and co-dimers of isoprene and cyclopentadiene are converted to monomeric isoprene and cyclopentadiene, subjecting the pyrolyzed mixture to fractional distillation to form (1) a C$_5$ fraction comprising monomeric isoprene and cyclopentadiene, and (2) a fraction comprising unconverted dimers, recycling the fraction comprising monomeric isoprene and cyclopentadiene to the dimerization step, and recycling the unconverted dimers to the last pyrolysis step.

2. A process for the separation of isoprene and cyclopentadiene from a hydrocarbon mixture containing the same which comprises heating the said hydrocarbon mixture to a temperature of between about 70° C. to about 120° C. whereby the cyclopentadiene dimerizes to dicyclopentadiene and part of the isoprene dimerizes to limonene and a co-dimer of isoprene and cyclopentadiene, separating out from the resulting mixture (1) a C$_5$ cut comprising isoprene, and (2) a high-boiling dimer fraction, heating the high-boiling dimer fraction at a temperature of between about 350° C. to about 450° C. for between about .5 to 4 seconds whereby the dicyclopentadiene is converted to monomeric cyclopentadiene, separating out from the pyrolyzed mixture, (1) a top product of cyclopentadiene, and (2) a bottom product of dimers unaffected by the pyrolysis treatment, heating the unconverted dimers at a temperature of between about 550° C. to about 650° C. for between about .5 second to 4 seconds whereby the limonene and co-dimer of isoprene and cyclopentadiene are converted to monomeric isoprene and cyclopentadiene, separating out from the pyrolyzed mixture (1) a C$_5$ fraction comprising monomeric isoprene and cyclopentadiene and (2) a fraction comprising unconverted dimers, recycling the fraction comprising monomeric isoprene and cyclopentadiene to the dimerization step and recycling the unconverted dimers to the last pyrolysis step.

3. A process for the separation of isoprene and cyclopentadiene from a hydrocarbon mixture containing the said isoprene and cyclopentadiene which comprises heating the said hydrocarbon mixture to dimerize substantially all of the cyclopentadiene to dicyclopentadiene, separating out of the resulting mixture (1) a fraction comprising monomeric isoprene and (2) a dimer fraction, heating the dimer fraction at a temperature of between about 150° C. to about 450° C. for a period of time derived from the formula $$\log t \text{ (seconds)} = \frac{7740}{T} - (13.1) \pm 1$$

wherein $t$ is the time of heating in seconds, and $T$ is the pyrolysis temperature in degrees Kelvin, to convert the dicyclopentadiene to monomeric cyclopentadiene, separating out of the pyrolyzed mixture (1) cyclopentadienes, and (2) dimers unaffected by the pyrolysis treatment, heating the unconverted dimers at a temperature of between about 500° C. to 700° C. for a short period of time whereby the limonene and co-dimers of isoprene and cyclopentadiene are converted to monomeric isoprene and cyclopentadiene, separating out of the pyrolysis mixture (1) a fraction comprising monomeric isoprene and cyclopentadiene, and (2) a fraction comprising the unconverted dimers and recycling the fraction comprising monomeric isoprene and cyclopentadiene to the dimerization step.

4. A process for the separation of isoprene and cyclopentadiene from a hydrocarbon mixture containing the said isoprene and cyclopentadiene which comprises dimerizing the said mixture to convert the cyclopentadiene to dicyclopentadiene, separating out a monomeric fraction comprising isoprene and a dimerized fraction, heating the dimerized fraction at a temperature of between about 150° C. to about 450° C. for a short time to convert the dicyclopentadiene to cyclopentadiene, separating out of the pyrolyzed mixture (1) cyclopentadiene, and (2) the unaffected dimer, heating the unaffected dimer fraction at a temperature above about 500° C. whereby the limonene and co-dimers of isoprene and cyclopentadiene formed in the initial dimerization step are converted to monomeric isoprene and cyclopentadiene, separating out a fraction comprising the monomeric isoprene and cyclopentadiene from the pyrolyzed mixture and recycing the said fraction to the initial dimerization step.

DANIEL B. LUTEN, Jr.
KENNETH W. HEDBERG.
ALDO DE BENEDICTIS.

REFERENCES CITED

The following references are of record in the file of this patent:

UNITED STATES PATENTS

| Number | Name | Date |
| --- | --- | --- |
| 1,065,182 | Staudinger | June 17, 1913 |
| 2,401,414 | Doumani et al. | June 4, 1946 |
| 2,414,651 | Latchum, Jr. | Jan. 21, 1947 |
| 2,453,044 | Staff | Nov. 2, 1948 |